(12) United States Patent
Minamino et al.

(10) Patent No.: US 8,009,902 B2
(45) Date of Patent: Aug. 30, 2011

(54) IMAGE PROCESSING APPARATUS AND METHOD FOR DETECTING A BACKGROUND COLOR BASED ON DATA CHROMINANCE DISTRIBUTION

(75) Inventors: Katsushi Minamino, Kyoto (JP); Naoki Nishioka, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 817 days.

(21) Appl. No.: 12/050,763

(22) Filed: Mar. 18, 2008

(65) Prior Publication Data

US 2008/0239347 A1 Oct. 2, 2008

(30) Foreign Application Priority Data

Mar. 26, 2007 (JP) ................. 2007-078914

(51) Int. Cl.
*G06K 9/34* (2006.01)
(52) U.S. Cl. ........ 382/164; 382/166; 382/171; 382/172; 358/1.1; 358/1.9
(58) Field of Classification Search .................. 382/162, 382/164, 166, 171, 172; 358/1.1, 1.9
See application file for complete search history.

(56) References Cited

U.S. PATENT DOCUMENTS

| | | | | |
|---|---|---|---|---|
| 6,757,426 B2 * | 6/2004 | Link et al. | ..... | 382/163 |
| 7,620,239 B2 * | 11/2009 | Minamino | ..... | 382/165 |
| 7,659,910 B2 * | 2/2010 | Hsu et al. | ..... | 345/589 |
| 2006/0193513 A1 | 8/2006 | Minamino | | |

FOREIGN PATENT DOCUMENTS

| | | | |
|---|---|---|---|
| JP | 02096477 | A | 4/1990 |
| JP | 05244406 | A | 9/1993 |
| JP | 05336384 | A | 12/1993 |
| JP | 2000339471 | A | 12/2000 |
| JP | 2002-305665 | | 10/2002 |
| JP | 2003-016444 | | 1/2003 |
| JP | 2003051946 | A | 2/2003 |
| JP | 200338930 | A | 11/2003 |
| JP | 2004-153586 | | 5/2004 |
| JP | 2006053682 | A | 2/2006 |
| JP | 2006-197172 | | 7/2006 |
| JP | 2006238321 | A | 9/2006 |
| JP | EP 1816874 A1 * | | 8/2007 |

OTHER PUBLICATIONS

Japanese language office action and its English language translation for corresponding Japanese application 2007078914 lists the references above, (Feb. 24, 2009).

* cited by examiner

*Primary Examiner* — Bhavesh Mehta
*Assistant Examiner* — Eueng-Nan Yeh
(74) *Attorney, Agent, or Firm* — DLA Piper LLP (US)

(57) ABSTRACT

A background color of a document is detected based on image data of a colormetric system in which brightness and color components are separated. A color plane is divided into color areas, and the number of elements of image data belonging to each color area is counted. The number of elements of image data belonging to each area of a multiple area constituted of mutually adjacent color areas is then counted. A color area in which the number of elements of image data exceeds a first threshold is extracted and given a positive evaluation. A multiple area in which the number of elements of image data exceeds a second threshold is extracted and a positive evaluation is given to each color area in the multiple area. A color area receiving a positive evaluation both individually and as part of a multiple area is specified as a background color.

20 Claims, 8 Drawing Sheets

FIG. 6A

| | COLOR AREA A0 | COLOR AREA A1 | COLOR AREA A2 | ·· |
|---|---|---|---|---|
| FIRST EVALUATION | COLOR AREA A0 | COLOR AREA A1 | COLOR AREA A2 | ·· |
| | NO | YES | NO | ·· |
| SECOND EVALUATION | MULTIPLE AREA B10 | MULTIPLE AREA B0 | MULTIPLE AREA B1 | ·· |
| | NO | YES | YES | ·· |
| | MULTIPLE AREA B0 | MULTIPLE AREA B1 | MULTIPLE AREA B2 | ·· |
| | YES | YES | NO | ·· |
| TOTAL EVALUATION | NO | YES | NO | ·· |

BACKGROUND COLOR AREA Ab

FIG. 6B

| | COLOR AREA A0 | COLOR AREA A1 | COLOR AREA A2 | ·· |
|---|---|---|---|---|
| FIRST EVALUATION | COLOR AREA A0 | COLOR AREA A1 | COLOR AREA A2 | ·· |
| | NO | YES | YES | ·· |
| SECOND EVALUATION | MULTIPLE AREA B15 | MULTIPLE AREA B0 | MULTIPLE AREA B1 | ·· |
| | NO | NO | YES | ·· |
| | MULTIPLE AREA B0 | MULTIPLE AREA B1 | MULTIPLE AREA B2 | ·· |
| | NO | YES | NO | ·· |
| TOTAL EVALUATION | NO | YES | YES | ·· |

BACKGROUND COLOR AREA Ab

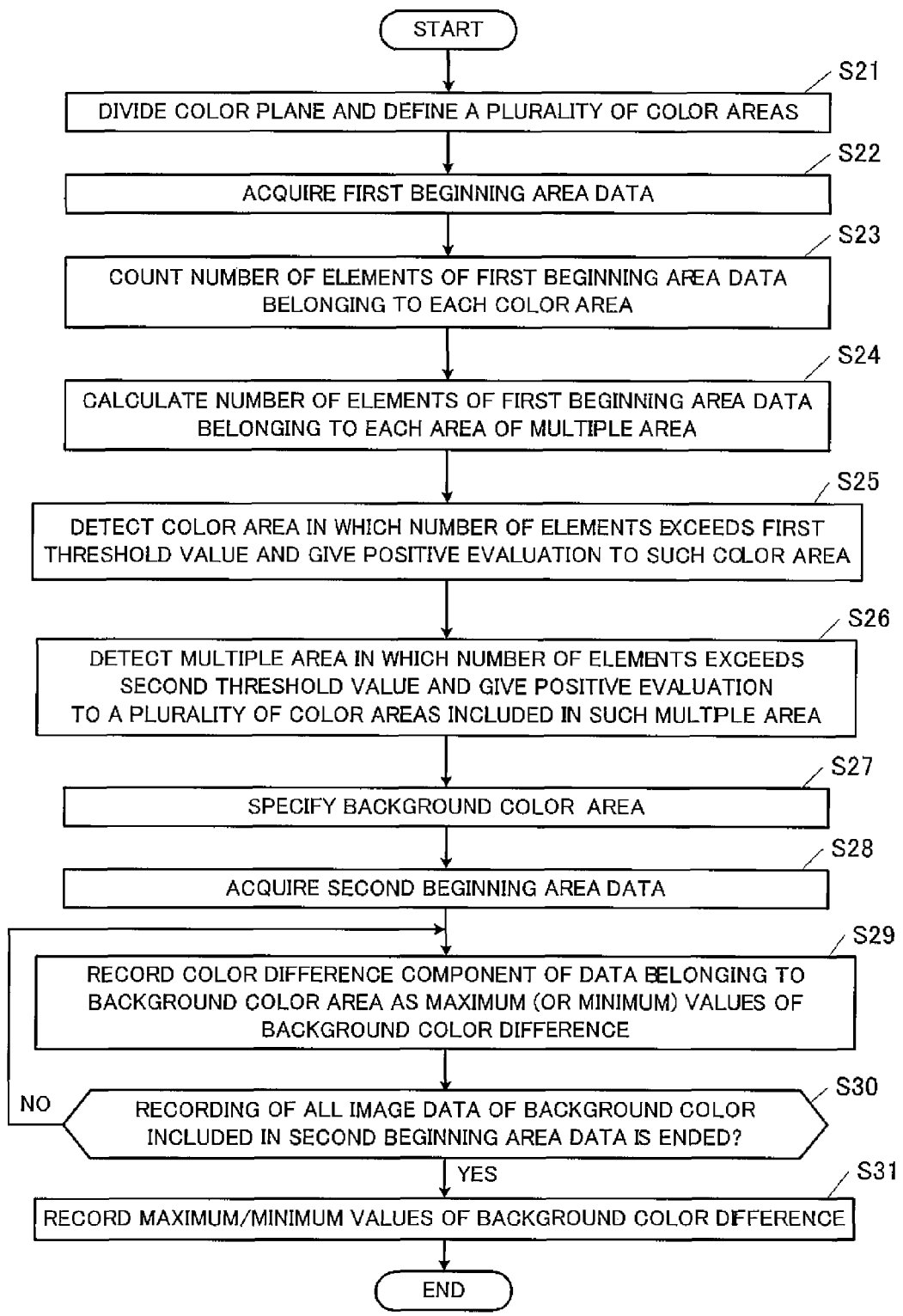

IMAGE PROCESSING APPARATUS AND METHOD FOR DETECTING A BACKGROUND COLOR BASED ON DATA CHROMINANCE DISTRIBUTION

CROSS-REFERENCE TO RELATED APPLICATIONS

This application claims priority under 35 U.S.C. 119 to Japanese Patent Application No. 2007-078914, filed on Mar. 26, 2007, which application is hereby incorporated by reference in its entirety.

BACKGROUND OF THE INVENTION

1. Field of the Invention

The present invention relates to an image processing apparatus that detects a background color of a document.

In this specification, "brightness" includes "luminance" as a photometric quantity (such as component Y in a YCbCr colormetric system) and "lightness" as a perceptive color (such as component L in an L*a*b* colormetric system) "Color" is a component separate from "brightness" in a three-dimensional color space, for example, the Cb and Cr components (color difference component) in the YCbCr colormetric system and the "a" and "b" components in the L*a*b* colormetric system.

2. Description of Related Art

An image processing apparatus, such as a facsimile machine, a copying machine, and a printer, that applies processing to image data acquired by scanning a document, includes a device capable of selecting a processing mode according to a color of the image data to be processed. For example, for a color image, the image processing apparatus selects a processing mode suitable for a color image, and for a monochrome document, the image processing apparatus selects a processing mode suitable for a monochrome image. Thus, by switching the processing mode, the image processing apparatus can perform suitable processing according to the color of the document.

In order for the image processing apparatus to select the processing mode, the color of the document must be discriminated. Therefore, a so-called ACS (auto color selection) function for automatically discriminating whether the document is color or monochrome is conventionally devised.

In order to discriminate whether the document is color, or black and white, for example, the a*b* plane of the L*a*b* uniform color space in the image processing apparatus is divided into 25 rectangle areas. The image processing apparatus discriminates whether the image data is color or monochrome based on which area data of a pixel included in the image data to be processed belongs.

For example, the color discriminated by an area of a maximum count number of the pixel data belonging to each area on the a*b*plane is set as a background color, and this area is specified as an area of background color.

However, when pixel data belonging to each area of the a*b*plane is counted, for example, and when image data of the background color is distributed over a plurality of areas, the count number of each area is dispersed, thus decreasing the count number itself. Accordingly, there is a possibility of erroneously specifying an area as an area of background color.

In addition, when an area is set in the vicinity of an original point of the a*b*plane (the achromatic axis), when image data attributable to the background color is not distributed in the vicinity of the original point (i.e. is distributed outside of the 25 rectangle areas), there is another problem in that a correct background color area cannot be detected.

BRIEF SUMMARY OF THE INVENTION

In view of these circumstances, the present invention provides an image processing apparatus and a background color detecting method that detects the existence or nonexistence of the background color with a simple structure based on image data of a colormetric system in which brightness and color components are separated. When there is a background color, it is easily and accurately detected.

In addition, the present invention accurately detects the color of the background color, even when image data attributable to the background color is not distributed in the vicinity of the original point.

A first aspect of the present invention is an image processing apparatus that detects a background color of a document based on image data of a colormetric system in which a brightness component and a color component are separated. A color plane defining the color component is divided into a plurality of color areas, and the number of elements of the image data belonging to each color area is counted. A color area in which the number of elements of image data exceeds a first threshold value is extracted and given a positive evaluation. The number of elements of image data belonging to each area of a multiple area constituted of a plurality of mutually adjacent color areas is also counted. A multiple area in which the number of elements of image data exceeds a second threshold value is extracted, and a positive evaluation is given to each color area included in the multiple area. A color area receiving a positive evaluation both individually and as part of a multiple area is specified as a color area of the background color.

Another aspect of the invention is an image processing apparatus that detects a background color of a document based on image data of a colormetric system in which a brightness component and a color component are separated. A color plane defining the color component is divided into a plurality of color areas, and the number of elements of image data belonging to each color area is counted. A color area in which the number of elements of image data exceeds the first threshold value is extracted and is given a positive evaluation. Based on this counted number of elements, the number of elements of image data belonging to a multiple area constituted of a plurality of mutually adjacent color areas is determined. A multiple area in which the number of elements of image data exceeds the second threshold value is extracted, and a positive evaluation is given to each color area included in the multiple area. A color area to which a positive evaluation is given both individually and as part of a multiple area is specified as a color area of the background color.

According to another aspect of the invention, the plurality of color areas are radially arranged around an achromatic axis of a color plane.

According to another aspect of the invention, each color area belongs to two multiple areas.

According to another aspect of the invention, image data belonging to the color area of the background color is extracted as background color image data out of the image data acquired by scanning a prescribed area of the document. A maximum value of the values of the color component of the background color image data is specified as the maximum value of the color component of the background color, and a minimum value of the values of the color component of the background color image data is specified as the minimum value of the color component of the background color.

According to the invention, when a color area of the background color is specified out of the plurality of color areas defined on the color plane, whether or not each color area is a color area of the background color is discriminated, in consideration of not only the number of elements of image data belonging to each color area, but also the number of elements of image data belonging to each multiple area constituted of adjacent color areas. Accordingly, the background color is easily and accurately detected, even when image data of the background color is distributed over a plurality of color areas. In addition, a plurality of color areas can be specified as color areas of the background color. That is, the color of the background is easily and accurately detected.

According to the invention, the number of elements of image data belonging to each color area is counted, and the number of elements of image data belonging to each area of the multiple areas is counted. Therefore, the number of elements belonging to each area is promptly counted and the speed of detecting the background color is improved.

According to one aspect of the invention, a plurality of color areas are radially arranged around the achromatic axis of the color plane. Therefore, wherever the image data attributable to the background color are distributed in the color plane, hue of the background color can be accurately detected.

According to one aspect of the invention, image data belonging to the color area of the background color is extracted as background color image data, and based on the value of the color component of the background color image data, the maximum and minimum values of the color component of the background color is specified. Therefore, the color component area of the background color is accurately and easily specified.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 6A is a diagram explaining the background color discrimination process according to the invention.

FIG. 6B is a diagram explaining another example of the background color discrimination process according to the invention.

FIG. 8 is a flow chart of the background color discrimination process according to the second embodiment.

DETAILED DESCRIPTION OF THE INVENTION

First Embodiment

<1. Structure>
<1-1 Digital Multifunction Peripheral>

Figure 1:
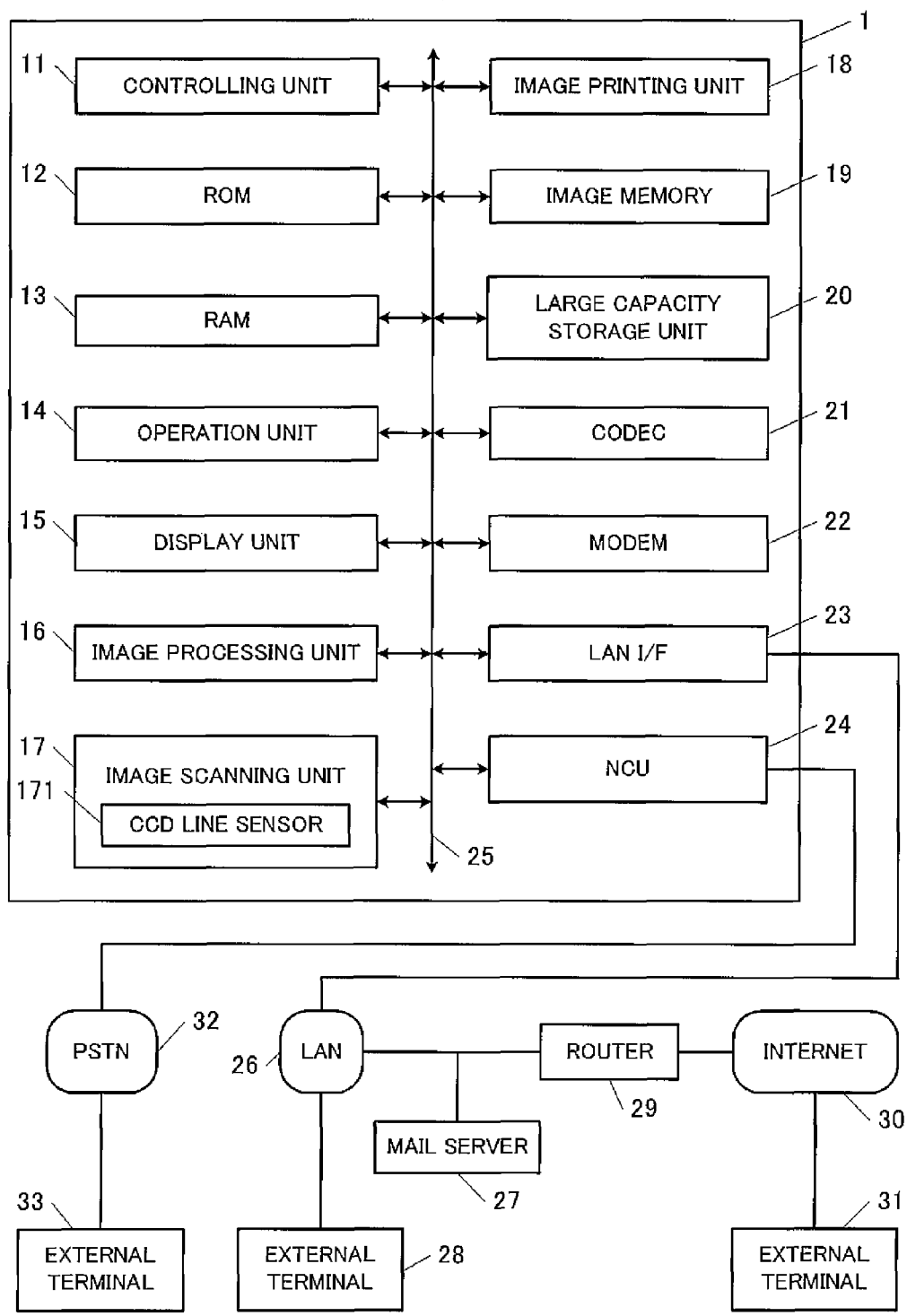
FIG. 1 is a block diagram of a digital multifunction peripheral (MFP) according to the present invention.

A digital multifunction peripheral (digital MFP) 1 incorporating an image processing apparatus corresponding to a first embodiment of the present invention is described with reference to FIG. 1.

The digital MFP 1 has a plurality of functions such as facsimile, copy, scan and print functions. The digital MFP 1 includes a controlling unit 11, a read only memory (ROM) 12, a random access memory (RAM) 13, an operation unit 14, a display unit 15, an image processing unit 16, an image scanning unit 17, an image printing unit 18, an image memory 19, a large capacity storage unit 20, and communication units 21-24, electrically connected via a bus line 25.

The controlling unit 11 comprises a central processing unit (CPU) and controls the aforementioned components of digital MPP 1 based on a program stored in the ROM 12.

The ROM 12 is a read-only storage device that previously stores the program and data necessary for controlling the digital MFP 1.

The RAM 13 is a reading/writing capable storage device that temporarily stores various accumulated data such as image data, telephone numbers, mail addresses, and data generated by arithmetic processes of the controlling unit 11. The RAM 13 may be, for example, a static RAM (SRAM).

The operation unit 14 comprises letter, number and function keys, and receives user operations such as input of commands and text data. A user operation received by the operation unit 14 is inputted in the controlling unit 11 as a signal. The controlling unit 11 controls the components of digital MFP 1 based on the user operation.

The display unit 15 displays information such as an operation state of the digital MFP 1 and image data, and may be, for example, a liquid crystal display. The input keys of the operation unit 14 may be realized as a touch screen displayed on display unit 15.

The image processing unit 16 applies various kinds of image processing to received image data and image data acquired from the image scanning unit 17. For example, the image scanning unit 17 serves as an analog-to-digital converter (A/D), and performs image processing such as correction processing (such as shading correction and gamma correction), conversion processing of the colormetric system (such as conversion of the image data of the RGB colormetric system to image data of the YCbCr colormetric system by a matrix operation process), color adjustment, and compounding of the image. The image processing unit 16 may be realized by software, by executing a program stored in the ROM 12.

The image scanning unit 17 serves as a scanner for scanning the image on the document with a scanning element (a charge coupled device (CCD) line sensor 171). The image data acquired by the image scanning unit 17 is, for example, compressed by a Joint Photographic Experts Group (JPEG) system, by a coder and decoder (CODEC) 21, and is stored in the image memory 19. The image scanning unit 17 may also be a scanner of a Flat Bed Scanner (FBS) system, which reads an image by scanning the surface of a document placed on a document platen with a scanning element. The image scanning unit 17 may also be a scanner of an ADF system, which feeds a document placed on a document tray with an Auto Document Feeder (ADF) and reads the image by scanning the surface of a fed document with a static scanning element.

An ADF system also includes a system in which a moving document is read by a static scanning optical system (sheet through system), and a system in which a static document is read by a moving scanning optical system. Either system may be adopted. However, when the latter system is adopted, the image scanning unit 17 repeats a reading procedure in which the document is fed on a glass base and placed on the glass base in a static state, then the static document is read by the moving scanning optical system, and the document that has gone through reading processing is ejected.

The CCD line sensor 171 generates image data expressed by an RGB color space, namely, RGB image data having color component data of red (R), green (G), and blue (B), by receiving light guided from the scanning optical system scanning the document at a prescribed scanning speed (a relative moving speed of the document and the scanning optical system), and repeating scanning at a constant cycle. The scanning speed of the scanning optical system is set based on a resolution in a sub scanning direction of image data generated by the CCD line sensor 171. As the resolution in the sub scanning direction increases, the scanning speed of the scanning optical system is decreased, and as the resolution in the sub scanning direction decreases, the scanning speed of the scanning optical system is increased.

The image printing unit 18 prints image data, etc stored in the image memory 19 on printing paper. For example, the image printing unit 18 may be a printer of an electrophotographic method.

The image memory 19 temporarily stores image data received from external devices 28, 31, 33 through a local area network interface (LANI/F) 23 and a network control unit (NCU) 24, image data acquired in the image scanning unit 17, and image data subjected to processing in the image processing unit 16. The image memory 19 is a memory such as a dynamic RAM (DRAM) that can be written to and read from.

The large capacity storage unit 20 may be, for example, a hard disc. Image data processed by the image scanning unit 17 can be stored in the large capacity storage unit 20.

The digital MFP 1 further includes a CODEC 21 that encodes/decodes image data correlated to a plurality of protocols; a modem 22 that modulates transmitted data and demodulates received data; a LAN I/F 23 that interfaces with a LAN 26; and an NCU 24 that connects and releases a telephone line, electrically connected via the bus line 25.

CODEC 21 may use an encoding system such as Modified Huffman (MH), Modified READ (Relative Address Designate) (MR), Modified MR (MMR), and Joint Bi-level Image experts Group (JBIG), which is used for encoding binary data. CODEC 21 also encodes multi-level data, for example, by the JPEG system.

The communication environment of digital MFP 1 is now explained. The digital MFP 1 is connected to the LAN 26. A mail server 27 and an external terminal 28 are connected to the LAN 26. The LAN 26 is also connected to Internet 30 via a router 29. With this structure, the digital MFP 1 performs electronic mail communication with the external terminal 28 connected thereto via the LAN 26, and an external terminal 31 connected thereto via the Internet 30.

Further, the digital MFP 1 is connected to Public Switched Telephone Network (PSTN) 32, which is a data communication network for analog lines. Thus, the digital MFP 1 performs communication with an external terminal 33 connected thereto via the PSTN 32. The external terminals 28, 31, 33 may be a personal computer having a modem connected thereto, another digital MFP 1, a telephone set, a mobile telephone, a facsimile machine, etc.

<1-2. Color Discriminating Function>

The digital MFP 1 has an auto color selection (ACS) function of discriminating the color of multi-level image data (such as image data of a document scanned by the image scanning unit 17).

Figure 2:
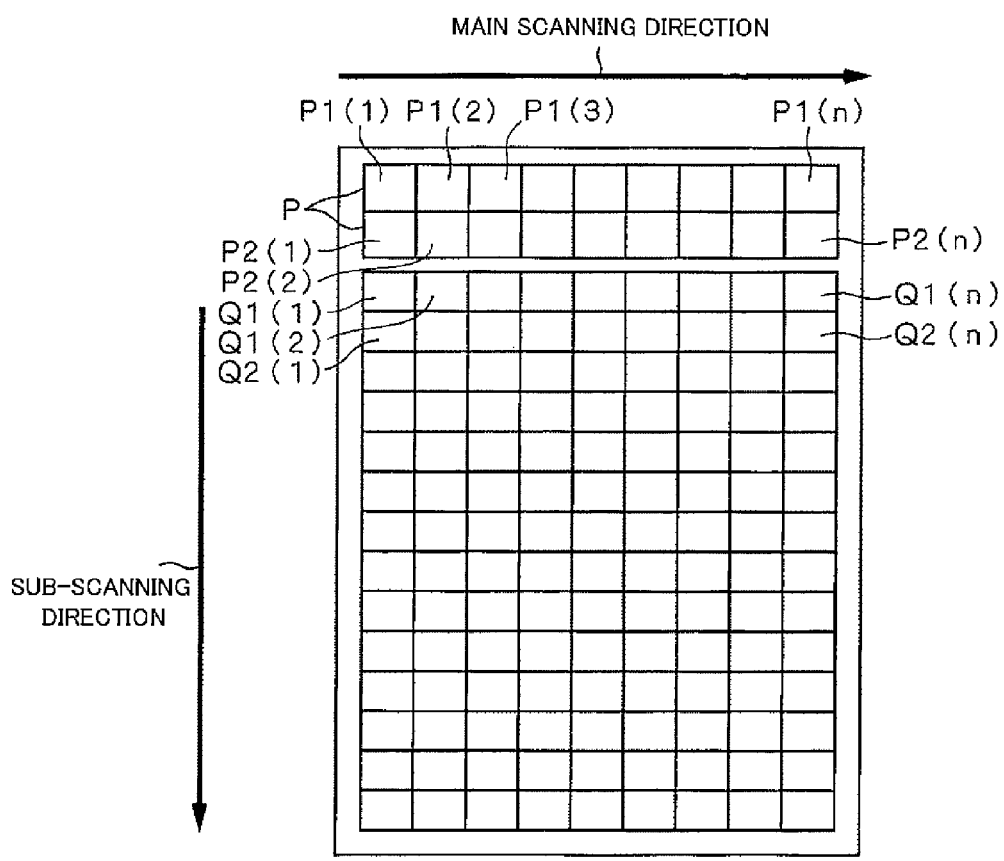
FIG. 2 is a diagram schematically illustrating a beginning area of the areas obtained by dividing a document into a plurality of areas according to the invention.

In this color discriminating function, first, the background color of the document is detected. More specifically, as shown in FIG. 2, the background color of the document is detected based on image data acquired by scanning beginning areas P1(1)-P1(n), P2(1)-P2(n) of areas obtained by dividing the document into a plurality of areas.

Then, a detection result of the background color is received, and based on image data acquired by reading further subsequent block areas Qi (i=1, 2, . . . ), the color of the document is discriminated. That is, whether the document shows a color image, a gray scale image, a bi-level image or a white paper (color paper) is discriminated. More specifically, a color area of a previously detected background color is masked and a color distribution of the image data is prepared. Then, based on this color distribution, the color of the document is discriminated. For example, in a document having black letter written on a yellow color base, the color area of the detected background color is masked and the color distribution of the document is prepared. Then, the color distribution of only black color that exists on the document is obtained. Accordingly, the document is discriminated not to be color but to be monochrome.

The aforementioned color discrimination result is received, and the digital MFP 1 selects the processing mode for processing the image data. For example, when the document is discriminated to show a color image, the processing mode is set in a "color mode", and when the document is discriminated to show a gray or bi-level image, the processing is set in a "monochrome mode". By changing the operation mode according to a color discrimination of the document, operation efficiency of the device is improved, and appropriate processing according to the kind of the color of the image is executed.

When color mode processing is executed, the image processing unit 16 acquires image data by converting multi-level RGB image data acquired by scanning a document with the image scanning unit 17 to multi-level YCbCr image data (image data expressed by the YCbCr color space). The CODEC 21 then compresses this image data by the JPEG system, etc, and stores it in the image memory 19.

When image data is acquired in the monochrome mode, a luminance component Y of the multi-level YCbCr image data of the document is first binarized by the image processing unit 16. When the document is a gray document, an error diffusion method and an ordered dither method, etc, are used, and when the document is a black and white document, a simple binarizing method is used. The CODEC 21 then compresses the binarized luminance component Y of the YCbCr image data using the MMR system and stores it in the image memory 19.

When image data is printed in the color mode, the image processing unit 16 first converts the multi-level YCbCr image data of the document to multi-level CMYK image data (image data expressed in the CMYK color space), and then binarizes the obtained multi-level CMYK image data to bi-level CMYK image data. Based on the obtained bi-level CMYK image data, the image printing unit 18 then forms the image on the printing paper. More specifically, by using the necessary engine out of the image forming engines of "Y", "M", "C", "K" (the necessary image forming engine for expressing the color included in the image), image formation is conducted on the printing paper.

When image data is printed in the monochrome mode, the image processing unit 16 first binarizes the luminance component Y of the multi-level YCbCr image data of the document. Based on the obtained bi-level image data, the image printing unit 18 then forms a monochrome image on the printing paper using the "K" image forming engine.

<1-3. Structure Regarding Background Color Discrimination>

Figure 3:
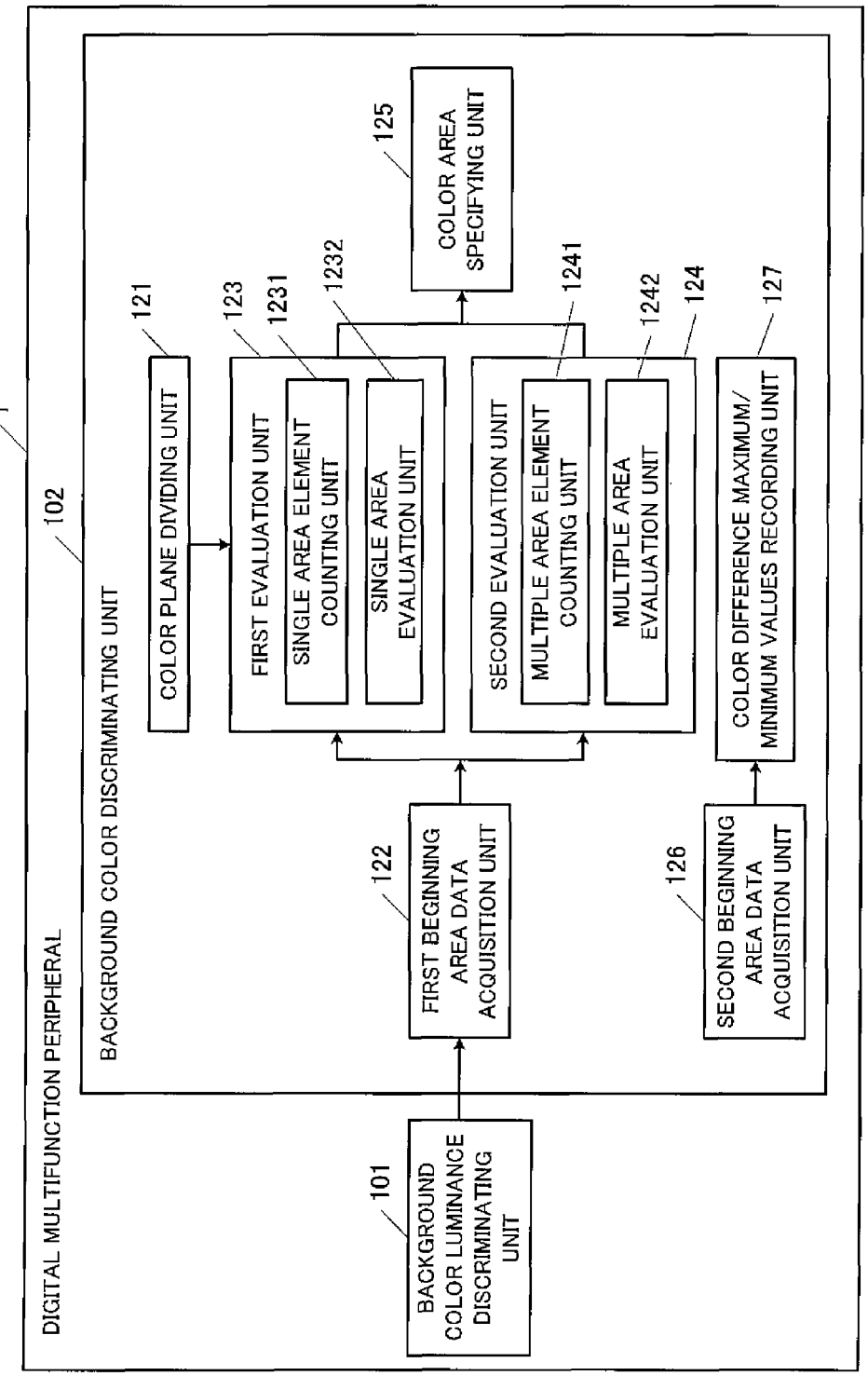
FIG. 3 is a block diagram of a structure of the digital MFP for discriminating a background color according to a first embodiment of the invention.

A background color discriminating function in the digital MFP 1 is now explained with reference to FIG. 3. The digital MFP 1 includes a background color luminance discriminating unit 101 that detects a brightness component of the background color (more specifically, the maximum and minimum values of the luminance component (Y) of the background color in the YCbCr color space), and a background color difference discriminating unit 102 that detects a color component of the background color (more specifically, the maximum and minimum values of the color difference component (Cb and Cr) of the background color in the YCbCr color space). A background color area in the YCbCr color space is detected, by the area of the luminance of the background color detected by the background color luminance discriminating unit 101 and the area of color difference of the background color detected by the background color difference discriminating unit 102. Units 101 and 102 are constitutional elements realized by execution of a program by the controlling unit 11.

<Background Color Luminance Discriminating Unit>

The background color luminance discriminating unit 101 detects a brightness component of the background color based on image data of the beginning areas P1(1)-P1(n), P2(1)-P2(n) (FIG. 2). More specifically, a histogram showing a distribution of the luminance of the image data of the beginning areas P1(1)-P1(n), P2(1)-P2(n) is prepared, and image data belonging to a class in which the frequency exceeds a prescribed threshold value (more specifically, image data newly counted as data belonging to this class after the frequency exceeds a prescribed threshold value) is detected as data attributable to the background color of the document (background color image data). The luminance component of this data is recorded as the maximum (or minimum) value of the luminance of the background color (background color luminance).

<Background Color Difference Discriminating Unit>

The background color difference discriminating unit 102 has a color plane dividing unit 121, a first beginning area data acquisition unit 122, a first evaluation unit 123, a second evaluation unit 124, a color area specifying unit 125, a second beginning area data acquisition unit 126, and a color difference maximum/minimum value recording unit 127.

Figure 5:
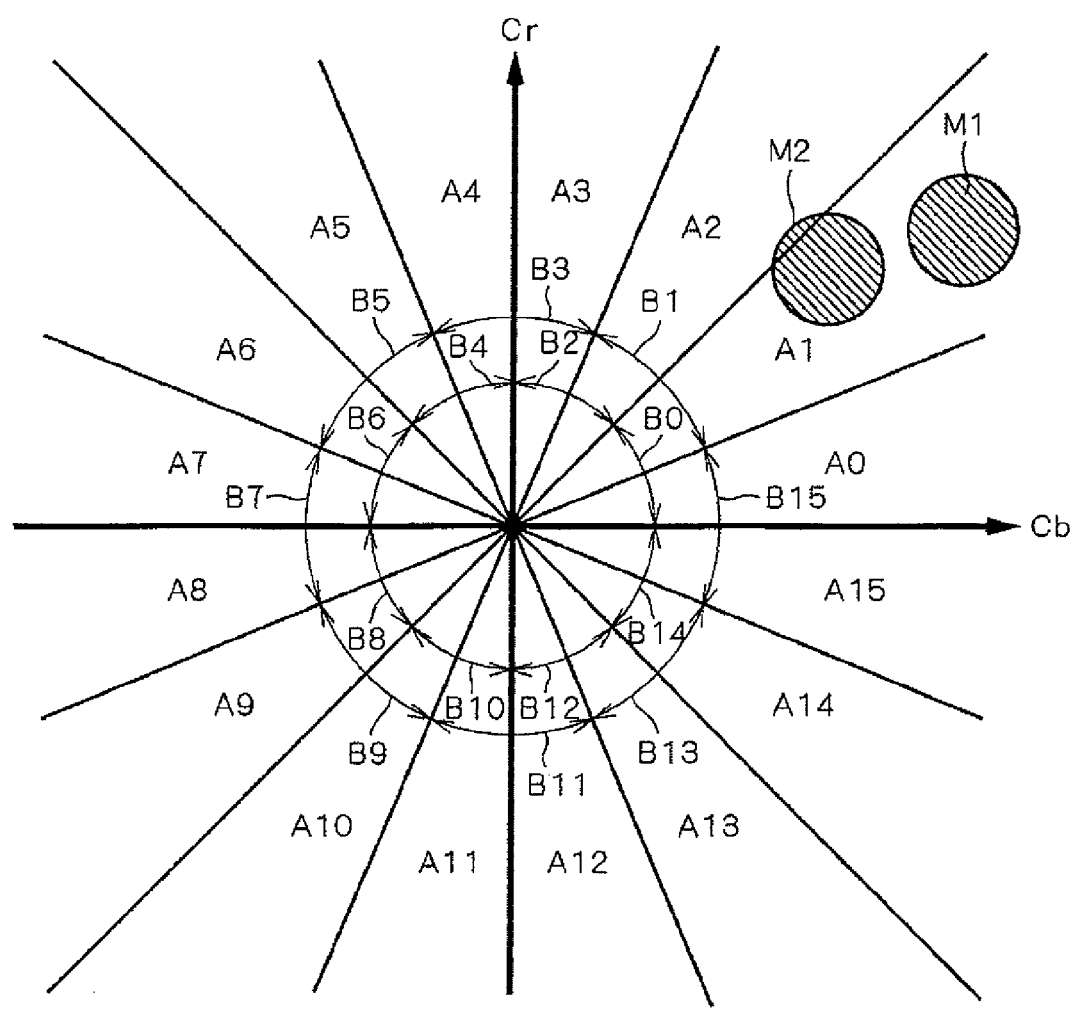
FIG. 5 is a diagram schematically illustrating a color plane according to the invention.

The color plane dividing unit 121 divides the color plane for defining the color difference component (namely, the CbCr plane) and defines a plurality of color areas Ai (i=0, 1, 2, ... N). More specifically, the color plane is divided into, for example, 16 divisions (N=15) radially around the original point (such as the achromatic axis) of the color plane (FIG. 5). As exemplified in FIG. 5, the color plane is equally divided into 16 divisions radially around the original point, and the color areas are shown as color areas A0, A1, ... A15 counterclockwise from a first quadrant.

The first beginning area data acquisition unit 122 acquires the image data of the areas of a front half (first beginning areas P1(1)-P1(n)) (FIG. 2) out of the beginning areas P1(1)-P1(n), P2(1)-P2(n), as the "first beginning area data dP1". More specifically, the image processing unit 16 applies a prescribed processing (a matrix operation process for converting RGB image data to YCbCr image data and each kind of correcting process) to image data of the RGB colormetric system acquired by scanning the first beginning areas P1(1)-P1(n) with the image scanning unit 17, and the YCbCr image data thus obtained is acquired as a first beginning area data dP1.

The image processing unit 16 may create the data for every "unit image" from the data for every "pixel" by a prescribed average processing. A "unit image" is an image composed of n-numbers of mutually adjacent pixels (n is a natural number of 2 or more), and the data of a unit image shows an average value of the n-numbers of pixel data included in the unit image. When the image processing unit 16 averages the pixel data, a first beginning area data acquisition unit 122 acquires the data of the unit image of the first beginning area as the first beginning area data dP1.

In one embodiment, all data included in the first beginning areas P1(1)-P1(n) is not acquired as the first beginning area data dP1. Rather, only data detected as background color image data by the background color luminance discriminating unit 101 out of all data included in the first beginning areas P1(1)-P1(n) is acquired as the first beginning area data dP1.

The first evaluation unit 123 evaluates each color area Ai (i=0, 1, 2, ... ) and has a single area element counting unit 1231 and a single area evaluation unit 1232.

The single area element counting unit 1231 counts the number of elements of the first beginning area data dP1 belonging to each color area Ai (i=0, 1, 2, ... ).

The single area evaluation unit 1232 evaluates each color area Ai (i=0, 1, 2, ... ). More specifically, the single area evaluation unit 1232 decides whether the number of elements of the first beginning area data dP1 counted by the single area element counting unit 1231 belonging to each color area Ai (i=0, 1, 2, ... ) exceeds a first threshold value W1. When the number of elements belonging to a particular color area exceeds the threshold value W1, the single area evaluation unit 1232 extracts this color area and gives it a positive evaluation.

The threshold value W1 is arbitrary and is previously set at a value that eliminates color areas in which image data attributable to something other than the ground color is distributed (such as image data of a small number of elements having the same color component, for example, dust that exists in the first beginning areas P1(1)-P1(n)) from being a candidate for a color area of the background color. A discrimination standard corresponding to the threshold value W1 may be defined, for example, as the number of elements itself or as a ratio of the number of elements (the ratio of occupancy of the number of elements in the whole number of elements included in the first beginning area data dP1, which is preferably about 5%). For example, when the threshold value W1 is set at the ratio of the number of elements=5%, a positive evaluation is given to a color area in which a number of elements exceeding 5% of the whole number of elements included in the first beginning area data dP1 is distributed.

The second evaluation unit 124 evaluates each color area Ai (i=0, 1, 2, ... ), and has a multiple area elements counting unit 1241 and a multiple area evaluation unit 1242.

The multiple area elements counting unit 1241 defines an area constituted of plural mutually adjacent (two in this embodiment) color areas Ai and Aj (wherein j=i+1 (0≦i≦N−1), j=0 (i=N)) out of the color areas Ai (i=0, 1, 2, ... N), as a multiple area Bi (i=0, 1, 2, ... N) (see FIG. 5). The multiple area elements counting unit 1241 counts the number of elements of the first beginning area data dP1 belonging to each area of the multiple area Bi (i=0, 1, 2, ... N).

The multiple area evaluation unit 1242 evaluates each color area Ai (i=0, 1, 2, ... ). More specifically, the multiple area evaluation unit 1242 decides whether the number of elements of the first beginning area data dP1 counted by the multiple area element counting unit 1241 belonging to each area of the multiple area Bi (i=1, 2, ... ) exceeds the second threshold value W2, and when the number of elements belonging to this area exceeds the threshold value W2, extracts this multiple area and gives a positive evaluation to each of the plurality of color areas included in these areas.

As shown in FIG. 5, each color area Ai belongs to two multiple areas B(i−1) and Bi (multiple areas B15 and B0 in case of a color area A0). When a positive evaluation is given to either of these multiple areas B(i−1) and Bi, multiple area evaluation unit 1242 gives a positive evaluation to this color area Ai.

The threshold value W2 is arbitrary and is previously set at a value capable of extracting the image data attributable to the background color (namely, image data with sufficiently many elements having the same color difference components and estimated to be the background color). The discrimination standard corresponding to the threshold value W2 may be, for example, the number of elements itself or may be defined as the ratio of the number of elements (the ratio of occupancy of the number of elements in the whole numbers of pixels included in the first beginning area data dP1, which is preferably about 60-70%). For example, when the threshold value W2 is set at the ratio of the number of elements=70%, a positive evaluation is given to a multiple area in which a number of elements exceeding 70% of the whole numbers of elements included in the first beginning area data dP1 is distributed.

Generally, when the values are compared by the same expression unit (for example, by the number of pixel elements or an occupancy ratio in the whole numbers of pixels), the second threshold value W2 is set larger than the first threshold value W1. When the number of color areas forming each multiple area is set at "m", the second threshold value W2 is preferably set larger than "m" times the first threshold value W1.

In a case that by performing such a second stage detection, a background color M2 is distributed across mutually adjacent color areas (A1 and A2 in the example of FIG. 5), and even if the number of pixels of the background color in one color area A2 is not so large, when the number of these pixels is added to the number of pixels of the background color in the adjacent color area A1, the resulting number of pixels is capable of discriminating this color area to be an area of the background color. Then, the threshold value W1 detected in each color area A1, A2 is set relatively smaller, and "candidates of the background color" are collected, and whether an assembly thereof forms a relatively large number of pixels in the multiple area B1 is discriminated, thereby specifying this multiple area B1 as the area of the background color.

The color area specifying unit 125 extracts the color area to which the positive evaluation is given from the first evaluation unit 123 and the second evaluation unit 124, and specifies this color area to be the color area of the background color (background color area Ab).

The second beginning area data acquisition unit 126 acquires the image data of a latter half area (second beginning areas P2(1)-P2(n)) of the beginning areas P1(1)-P1(n), P2(1)-P2(n), as a "second beginning area data dP2". More specifically, YCbCr image data is acquired as the second beginning area data dP2 by applying a prescribed processing with the image processing unit 16, such as the matrix operation process for converting RGB image data to YCbCr image data, each kind of correction process, and average process, etc. to the image data of the RGB colormetric system acquired by scanning the second beginning areas P2(1)-P2(n) with the image scanning unit 17.

The color difference maximum/minimum value recording unit 127 detects data belonging to the background color area Ab out of the second beginning area data dP2 as data attributable to the background color of the document (background color image data), and records the color difference component of this data (components Cb and Cr) as the maximum (or minimum) value of the color difference of the background color (background color difference). More specifically, the background color area Ab is first specified by receiving from the color area specifying unit 125 a notice reporting any one of the 16 color areas on the color plane to which the background color Ab belongs.

Whether data included in the second beginning area data dP2 acquired by the second beginning area data acquisition unit 126 belongs to any one of the plurality of color areas Ai (i=0, 1, 2, ...) is then decided. Data that is decided to belong to the background color area Ab is extracted as background color image data. When a color difference value of the extracted background color image data is larger than the maximum value of the background color difference recorded at present, this color difference value is recorded as a new maximum value. Similarly, when a color difference value of the extracted background color image data is smaller than the minimum value of the background color difference recorded at present, this color difference value is recorded as a new minimum value.

<2. Processing Operation>

Figure 4:
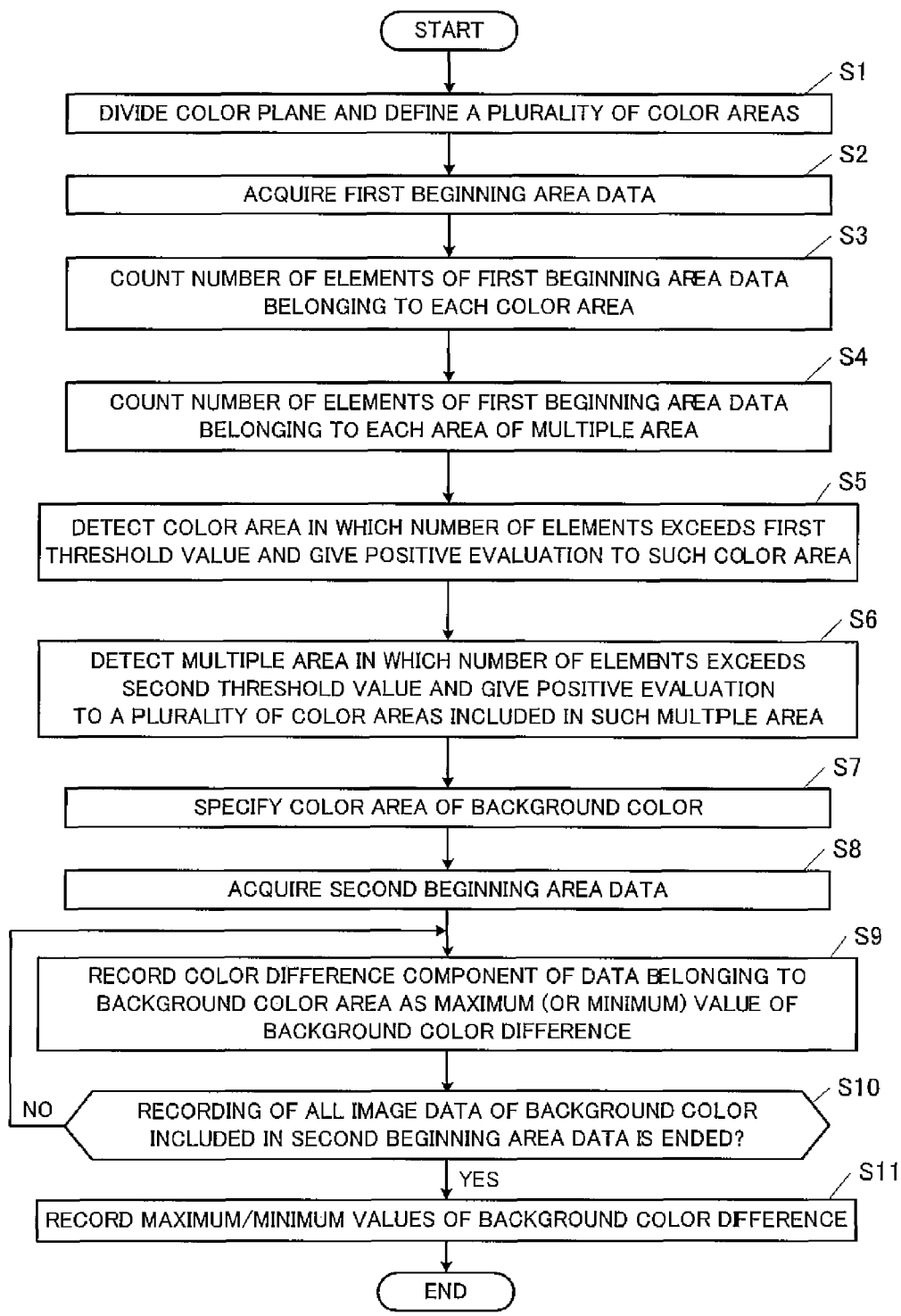
FIG. 4 is a flow chart of a background color discrimination process according to the first embodiment.

Background color discrimination processing performed as one process of the color discrimination processing in the digital MFP 1 is now explained with reference to FIGS. 4-6. FIG. 4 illustrates a flow of the background color discrimination processing. FIG. 5 schematically illustrates the color plane. FIGS. 6A and 6B explain the background color discrimination processing.

In step S1, the color plane dividing unit 121 divides the color plane for defining the color difference component of the image data, and defines the plurality of color areas Ai (i=0, 1, 2, ... N (N=15 in FIG. 5)).

In step S2, the first beginning area data acquisition unit 122 acquires the first beginning area data dP1. Note that, in a stage prior to or in parallel with step S1, the processing of detecting the background color image data out of the whole data included in the first beginning area P1(1)-P1(n) is executed by the background luminance discriminating unit 101. The background color image data thus detected is then acquired as the first beginning area data dP1 by the background color difference discriminating unit 102 in step S1.

Subsequently, the single area element counting unit 1231 counts the number of elements of the first beginning area data dP1 belonging to each color area Ai(i=0, 1, 2, ... ) (step S3).

The multiple area element counting unit 1241 then counts in step S4 the number of elements of the first beginning area data dP1 belonging to each area of the multiple area Bi (i=1, 2, ... ).

The single area evaluation unit 1232 then decides whether the number of elements of the first beginning area data dP1 belonging to this area (namely, the number of elements counted by the single area element counting unit 1231 in step S3) exceeds the first threshold value W1. In step S5, when a color area is detected in which the number of elements of image data exceeds the first threshold value W1, the single area evaluation unit 1232 gives a positive evaluation to this color area.

The multiple area evaluation unit 1242 then decides whether a multiple area having a number of elements of the first beginning area data dP1 (the number of elements counted by the multiple area element counting unit 1241 in step S4) that exceeds the second threshold value W2 is detected. In step S6, when a multiple area in which the number of elements exceeds the second threshold value W2 is detected, the multiple area evaluation unit 1242 gives a positive evaluation to the two color areas included in this multiple area.

In step S7, the color area specifying unit 125 extracts the color area to which a positive evaluation is given from the first evaluation unit 123 in step S5 and a positive evaluation is given from the second evaluation unit 124 in step S6, and specifies this color area as the background color area Ab.

An example is now described with reference to FIGS. 5 and 6A. When the first beginning area data dP1 is uniformly distributed in area M1 included in the color area A1, the first evaluation unit 123 gives a positive evaluation to the color area A1 in step S5. In step S6, the second evaluation unit 124 gives a positive evaluation to the two color areas A0 and A1 included in the multiple area B0, and also gives a positive evaluation to the two color areas A1 and A2 included in the multiple area B1. In this case, in step S7, the color area specifying unit 125 specifies the color area A1 as the background color area Ab.

Another example is described with reference to FIGS. 5 and 6B. When the first beginning area data dP1 is uniformly distributed in the area M2 over areas A1 and A2, in step S5, the first evaluation unit 123 gives a positive evaluation to both color areas A1 and A2. In step S6, the second evaluation unit 124 gives a positive evaluation to the two color areas A0 and A1 included in the multiple area B0, and to the two color areas A1 and A2 included in the multiple area B1. In this case, in step S7, the color area specifying unit 125 specifies the color areas A1 and A2 as the background color area Ab.

In this example, it is assumed that the pixels in the color area A1 out of the pixels belonging to the area M2 occupies 65% in the whole numbers of pixels, and that the pixels in the area A2 occupies 10% in the whole numbers of pixels. At this time, as a comparison technique, when the background color is detected by setting a threshold value W0 at 70% in the individual color area, detection is performed, with the threshold value W1 set at 5% and the threshold value W2 set at 70% as the occupancy ratio in the whole number of pixels, (in order to satisfy 10%>5%=W1, 65%>5%=w1), a positive evaluation is given to both areas A1 and A2 as candidates of a part of the background color. Then, in order to satisfy 10%+65%=75%>70%=W2, a positive evaluation is also given to a set of them, as the background color.

FIG. 4 is referenced again. In step S8, the second beginning area data acquisition unit 126 acquires the second beginning area data dP2.

In step S9, the color difference maximum/minimum value recording unit 127 detects data belonging to the background color area Ab specified in step S7 as background color image data, and records the color difference component of this data as the maximum (or minimum) value of the background color difference.

When recording of all background color image data included in the second beginning area data dP2 is ended (YES in step S10), in step S11, the color difference maximum/minimum recording unit 127 stores the maximum/minimum values recorded at this time as the maximum/minimum values of the background color difference. The color difference area of the background color is specified by the above-described processing.

<3. Advantage>

According to the above-described embodiments of the invention, in specifying the color area of the background color (background color area Ab) out of the plurality of color areas Ai (i=1, 2 . . . ) defined on the color plane for defining the color component, whether each color area Ai (i=0, 1, 2, . . . ) is a color area of the background color is decided not only in consideration of the number of elements of image data belonging to each color area Ai (i=1, 2 . . . ), but also the number of elements of image data belonging to each multiple area Bi (i=0, 1, 2, . . . ) constituted of the color area Ai and an adjacent color area Aj. Accordingly, even when image data of the background color is distributed over a plurality of color areas, these color areas are extracted and accurately specified as color areas of the background color.

In addition, according to the above-described embodiments of the invention, the color plane is radially divided around the original point (the achromatic axis) such that a plurality of color areas Ai (i=0, 1, 2, . . . ) is arranged radially around the original point. Therefore, even if image data attributable to the background color is distributed far from the original point, the hue of the background color is still accurately detected.

In addition, according to the above-described embodiments of the invention, the color plane is divided into 16 color areas. When the color area is subdivided, while there is an advantage that the background color area can be accurately specified, there is also a drawback that the discrimination processing is complicated. According to the present invention, the color plane is divided into 16 color areas, and one color area or two mutually adjacent color areas are detected as background color areas. Therefore, the background color area is appropriately discriminated with relatively simple discrimination processing.

In addition, according to the above-described embodiments of the invention, the color difference maximum/minimum value recording unit 127 detects data of the second beginning area data dP2 belonging to the background color area Ab as background color image data, and records the color difference component of this data as the maximum/minimum values of the color of the background. Therefore, the color difference area of the background color (color component area) is accurately and easily specified.

In addition, according to the above-described embodiments of the invention, first, existence/nonexistence of the background color is discriminated and the background color area Ab is specified, based on image data acquired by scanning the front half areas (the first beginning areas P1(1)-P1(n)) of the beginning areas P1(1)-P1(n), P2(1)-P2(n), and then, the maximum and minimum values of the background color difference are specified, based on image data acquired by scanning the latter half areas (the second beginning areas P2(1)-P2(n)) of the beginning areas P1(1)-P1(n), P2(1)-P2 (n).

With this structure, discrimination processing is performed while sequentially using image data sequentially acquired by scanning the document with the CCD line sensor 171 (more specifically, image data acquired by the CCD line sensor 171 and then further subjected to correction processing of misalignment of the image based on a position of each RGB line sensor). Thus, there is no need to accumulate scanned image data that is further subjected to scanning for discrimination. Accordingly, discrimination processing is promptly performed.

Second Embodiment

<1. Structure>

<1-1. Digital Multifunction Peripheral>

A digital MFP 2 incorporating an image processing apparatus corresponding to a second embodiment of the present invention is now described. The digital MFP 2 is constituted as an MFP in the same way as the digital MFP 1 and has the structure of FIG. 1. Therefore, only points different from the first embodiment are explained hereafter, and explanation for points not different from the first embodiment is omitted. Also, when a common constitution part is indicated, reference characters used in the explanation of the first embodiment are used in some cases.

Like the digital MFP 1, the digital MFP 2 has an ACS function of discriminating the color of multi-level image data, and selects the processing mode for processing image data based on this discrimination result. A background color discriminating function realized by the digital MFP 2 is now described.

<1-2. Structure Regarding the Background Color Discrimination>

Figure 7:
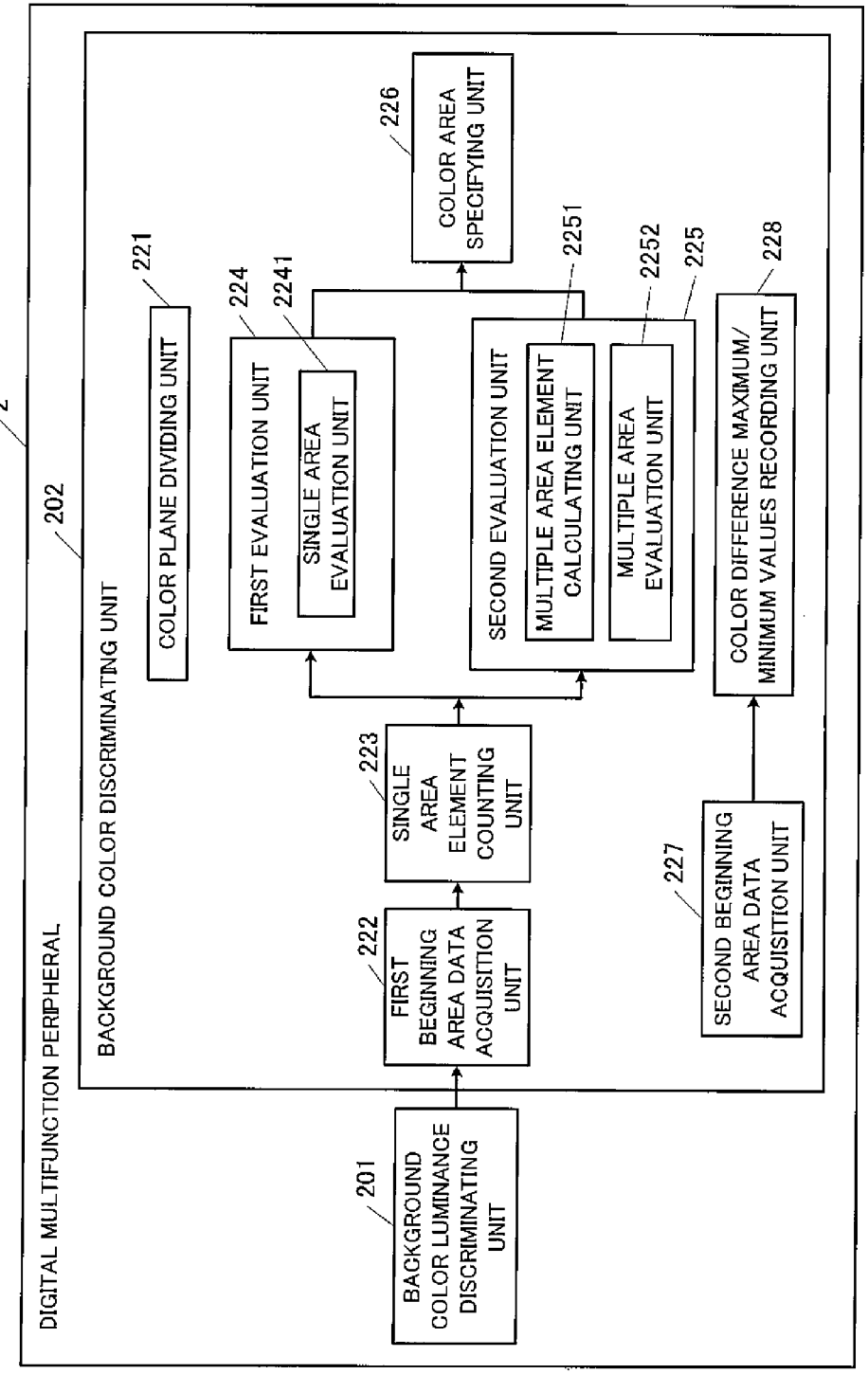
FIG. 7 is a block diagram of a structure for discriminating the background color according to a second embodiment of the invention.

The background color discriminating function in the digital MFP 2 is explained with reference to FIG. 7. FIG. 7 is a block diagram of the structure relating to background color discrimination. A background color luminance discriminating unit 201 detects a brightness component of the background color, and a background color difference discriminating unit 202 detects a color component of the background color. The background color area in the YCbCr color space is detected by a luminance area detected by the background color luminance discriminating unit 201 and a color difference area detected by the background color discriminating unit 202. Units 101 and 102 are realized by executing a program with the controlling unit.

<Background Color Luminance Discriminating Unit>

The background color discriminating unit 201 has the same structure as that of the background color discriminating unit 101 of the first embodiment, so repeat explanation is omitted.

<Background Color Difference Discriminating Unit>

The background color difference discriminating unit 202 has a color plane dividing unit 221, a first beginning area data acquisition unit 222, a single area element counting unit 223, a first evaluation unit 224, a second evaluation unit 225, a color area specifying unit 226, a second beginning area data acquisition unit 227, and a color difference maximum/minimum value recording unit 228. The color plane dividing unit 221, the first beginning area data acquisition unit 222, the color area specifying unit 226, the second beginning area data acquisition unit 227, and the color difference maximum/minimum value recording unit 228 are the same as the color plane dividing unit 121, the first beginning area data acquisition unit 122, the color area specifying unit 125, the second beginning area data acquisition unit 126, and the color difference maximum/minimum value recording unit 127 of the first embodiment. Also, the single area element counting unit 223 is the same as the single area counting unit 1231.

The first evaluation unit 224 evaluates each color area Ai (i=0, 1, 2, . . . ) and has a single area evaluation unit 2241. The single area evaluation unit 2241 is the same as the singe area evaluation unit 1232 of the first embodiment.

The second evaluation unit 225 evaluates each color area Ai (i-0, 1, 2, . . . ) and has a multiple area element calculating unit 2251 and a multiple area evaluation unit 2252.

The multiple area element calculating unit 2251 calculates the number of elements of the first beginning area data dP1 belonging to each area of the multiple area Bi (i=0. 1, 2, . . . N) based on the number of elements counted by the single area element counting unit 223 (namely, the number of elements of the first beginning area data dP1 belonging to each color area Ai (i=0, 1, 2, . . . )). More specifically, the number of elements of the first beginning area data dP1 belonging to each of the color areas Ai and Aj (wherein j=i+1 (0≦i≦N−1), j=0 (i=N)) constituting the multiple area Bi (i=0, 1, 2, . . . N) is acquired by the single area element counting unit 223. A sum of two values thus acquired is calculated, and the number of elements of the first beginning area data dP1 belonging to the multiple area Bi (i=0, 1, 2, . . . N) is thus acquired.

In the same way as the multiple area evaluation unit 1232 according to the first embodiment, the multiple area evaluation unit 2252 evaluates each color area Ai (i=0, 1, 2, . . . ).

More specifically, the multiple area evaluation unit 2252 decides whether the number of elements of the first beginning area data dP1 belonging to each area of the multiple area Bi (i=1, 2, . . . ), namely, the number of elements calculated by the multiple area element calculating unit 2251, exceeds the second threshold value W2. When the number of elements exceeds the threshold value W2, the multiple area evaluation unit 2252 extracts this multiple area and gives a positive evaluation to each color area included in this multiple area.

<2. Operation>

The background color discrimination processing performed as one process of color discrimination processing in the digital MFP 2 is now described with reference to FIG. 8, which illustrates the flow of the background color discrimination processing.

The processing of steps S21-S23 is the same as that of steps S1-S3 of the first embodiment. That is, in step S21, the color plane dividing unit 221 divides the color plane for defining the color difference component of the image data, and defines a plurality of color areas Ai (i=0, 1, 2, . . . N). In step S22, the first beginning area data acquisition unit 222 acquires the first beginning area data dP1. Then, in step S23, the single area element counting unit 223 counts the number of elements of the first beginning area data dP1 belonging to each color area Ai (i=0, 1, 2, . . . ).

In step S24, based on the number of elements counted by the single area element counting unit 223, the multiple area element calculating unit 2251 calculates the number of elements of the first beginning area data dP1 belonging to each area of the multiple area Bi (i=0, 1, 2, . . . N).

In step S25, the single area evaluation unit 2241 decides whether a color area having a number of elements of the first beginning area data dP1 (namely, the number of elements counted by the single area element counting unit 223 in step S23) that exceeds the first threshold value W1 is detected. When the number of elements of image data exceeds the first threshold value W1, a positive evaluation is given to the color area.

In step S26, the multiple area evaluation unit 2252 then decides whether a multiple area having a number of elements of the first beginning area data dP1 (namely, the number of elements calculated by the multiple area element calculating unit 2251 in step S24) that exceeds the second threshold value W2 is detected. When the number of elements exceeds the second threshold value W2, a positive evaluation is given to both color areas included in this multiple area.

In step S27, the color area specifying unit 226 extracts the color area to which a positive evaluation is given from the first evaluation unit 224 in step S25 and from the second evaluation unit 225 in step S26, and specifies this color area as the background color area Ab.

The processing of steps S28-S31 is the same as that of steps s8-S11 of the first embodiment. In step S28, the second beginning area data acquisition unit 227 acquires the second beginning area data dP2. In step S29, the color difference maximum/minimum value recording unit 228 detects data out of the second beginning area data dP2 belonging to the background color area Ab specified in step S27 as background color image data, and records the color difference component of this data as the maximum (or minimum) value of the background color difference. When recording of all background color image data included in the second beginning area data dP2 is ended (YES in step S30), in step S31, the color difference maximum/minimum value recording unit 228 stores the maximum value/minimum value recorded at this time as the maximum value/minimum value of the background color difference.

MODIFIED EXAMPLE

In the first embodiment of the invention, each processing step such as counting the number of elements of the first beginning area data dP1 belonging to the color area Ai by the single area element counting unit 1231 in step S3, and counting the number of elements of the first beginning area data dP1 belonging to the multiple area Bi by the multiple area element counting unit 1241 in step S4, are sequentially performed. However, these processing steps can be executed in parallel. Similarly, the evaluation of the color area Ai by the single area evaluation unit 1232 (step S5) and the evaluation of the multiple area Bi by the multiple area evaluation unit 1242 (step S6) can be executed in parallel. The speed of background color discrimination processing is thereby increased.

In addition, in the above-described embodiments, although each multiple area Di is described as constituted of two mutually adjacent color areas Ai and Aj, it may also be constituted of two or more mutually adjacent color areas. In addition, the number of color areas included in each multiple area Bi may not necessarily be the same.

In addition, although the background color is discriminated based on YCbCr image data in the above-described embodiments, the background color can also be discriminated based on image data of other colormetric systems (for example, the L*a*b*, YIQ and Luv colormetric systems) in which the brightness and color components are separated.

In addition, the background color is discriminated in the above-described embodiments based on data acquired by scanning a beginning area of a document. However, the present invention is not limited thereto. Discrimination of the background color may be performed, for example, by using a rear end of the object image and a part of a right tip end of the image data.

In addition, according to the above-described embodiments, image data used for discriminating the existence/non-existence of a background color and specifying the background color area Ab, and image data used for specifying the maximum/minimum values of the background color difference, are acquired by scanning mutually different areas. However, both types of image data may be obtained by using the same area.

In addition, in the above-described each embodiment, the background color luminance discriminating unit 101 and the background color difference discriminating unit 102 are realized by executing a program by the controlling unit 11. However, they may be realized by a wired logic circuit.

While the present invention has been described with respect to embodiments thereof, it will be apparent to those skilled in the art that the disclosed invention may be modified in numerous ways and may assume many embodiments other than those specifically set out and described above. Accordingly, the appended claims cover all modifications that fall within the true spirit and scope of the present invention.

What is claimed is:

1. An image processing apparatus that detects a background color of a document based on image data of a colormetric system in which a brightness component and a color component are separated, comprising:
    a processor programmed to control:
    a first element counting unit that divides a color plane defining the color component into a plurality of color areas, and counts a number of elements of the image data belonging to each of the plurality of color areas;
    a single area evaluation unit that extracts a color area in which the number of elements of the image data exceeds a first threshold value, and gives a positive evaluation to the extracted color area;
    a second element counting unit that counts a number of elements of the image data belonging to each area of a multiple area constituted of mutually adjacent color areas of the plurality of color areas;
    a multiple area evaluation unit that extracts a multiple area in which the number of elements of the image data exceeds a second threshold value, and gives a positive evaluation to each color area included in the extracted multiple area; and
    a color area specifying unit that specifies a color area to which a positive evaluation is given by both the single area evaluation unit and the multiple area evaluation unit as a color area of background color.

2. The image processing apparatus according to claim 1, wherein the plurality of color areas are arranged radially around a center of an achromatic axis of the color plane.

3. The image processing apparatus according to claim 2, wherein each of the plurality of color areas belongs to two areas of the multiple areas.

4. The image processing apparatus according to claim 1, further comprising a background color component specifying unit that:
    extracts image data belonging to the color area of the background color as background color image data, out of the image data acquired by scanning a prescribed area of the document;
    specifies a maximum value of values of the color component of the background color image data as the maximum value of the color component of the background color; and
    specifies a minimum value of the values of the color component of the background color image data as the minimum value of the color component of the background color.

5. An image processing apparatus that detects a background color of a document based on image data of a colormetric system in which a brightness component and a color component are separated, comprising:
    a processor programmed to control:
    an element counting unit that divides a color plane defining a color component into a plurality of color areas, and counts a number of elements of the image data belonging to each of the plurality of color areas;
    a single area evaluation unit that extracts a color area in which the number of elements of the image data exceeds a first threshold value, and gives a positive evaluation to the extracted color area;
    a multiple area element calculating unit that calculates the number of elements of the image data belonging to each area of a multiple area constituted of mutually adjacent color areas of the plurality of color areas, based on the number of elements counted by the element counting unit;
    a multiple area evaluation unit that extracts a multiple area in which the number of elements of the image data exceeds a second threshold value, and gives a positive evaluation to each color area included in the extracted multiple area; and
    a color area specifying unit that specifies a color area to which a positive evaluation is given by both the single area evaluation unit and the multiple area evaluation unit, as the color area of background color.

6. The image processing apparatus according to claim 5, wherein the plurality of color areas are arranged radially around a center of an achromatic axis of the color plane.

7. The image processing apparatus according to claim 6, wherein each of the plurality of color areas belongs to two of the multiple areas.

8. The image processing apparatus according to claim 5, further comprising a background color component specifying unit that:
   extracts image data belonging to the color area of background color as background color image data, out of the image data acquired by scanning a prescribed area of the document;
   specifies a maximum value of values of the color component of the background color image data as the maximum value of the color component of the background color; and
   specifies a minimum value of the values of the color component of the background color image data as the minimum value of the color component of background color.

9. An image processing apparatus that detects a background color of a document based on image data of a colormetric system in which a brightness component and a color component are separated, comprising:
   a processor programmed to control:
   means for dividing a color plane defining the color component into a plurality of color areas, and counting a number of elements of the image data belonging to each of the plurality of color areas;
   means for extracting a color area in which the number of elements of the image data exceeds a first threshold value and giving a positive evaluation to the extracted color area;
   means for specifying a multiple area as an area constituted of mutually adjacent color areas of the plurality of color areas;
   means for counting the number of elements of the image data belonging to each area of the multiple area;
   means for extracting a multiple area in which the number of elements of the image data exceeds a second threshold value and giving a positive evaluation to the plurality of color areas included in the extracted multiple area; and
   means for specifying a color area to which the positive evaluation is given by the means for extracting the color area and the means for extracting the multiple area as a color area of background color.

10. The image processing apparatus according to claim 9, wherein the plurality of color areas are arranged radially around a center of an achromatic axis of the color plane.

11. The image processing apparatus according to claim 10, wherein each of the plurality of color areas belongs to two of the multiple areas.

12. The image processing apparatus according to claim 9, further comprising means for:
   extracting image data belonging to the color area of background color as background color image data, out of the image data acquired by scanning a prescribed area of a document;
   specifying a maximum value of values of the color component of the background color image data as the maximum value of the color component of background color; and
   specifying a minimum value of the values of the color component of the background color image data as the minimum value of the color component of background color.

13. An image processing apparatus that detects a background color of a document based on image data of a colormetric system in which a brightness component and a color component are separated, comprising:
   a processor programmed to control:
   means for dividing a color plane defining the color component into a plurality of color areas, and counting a number of elements of the image data belonging to each of the plurality of color areas;
   means for extracting a color area in which the number of elements of the image data exceeds a first threshold value and giving a positive evaluation to the extracted color area;
   means for calculating the number of elements of the image data belonging to each area of a multiple area constituted of mutually adjacent color areas of the plurality of color areas, based on the number of elements counted by an element counting unit;
   means for extracting a multiple area in which the number of elements of the image data exceeds a second threshold value, and giving a positive evaluation to the plurality of color areas included in the extracted multiple area; and
   means for specifying the color area to which the positive evaluation is given by the means for extracting the color area and the means for extracting the multiple area as a color area of background color.

14. The image processing apparatus according to claim 13, wherein the plurality of color areas are arranged radially around a center of an achromatic axis of the color plane.

15. The image processing apparatus according to claim 14, wherein each of the plurality of color areas belongs to two of the multiple areas.

16. The image processing apparatus according to claim 13, further comprising means for:
   extracting image data belonging to the color area of background color as background color data, out of the image data acquired by scanning a prescribed area of the document;
   specifying a maximum value of values of the color component of the background color image data as the maximum value of the color component of background color; and
   specifying a minimum value of the values of the color component of the background color image data as the minimum value of the color component.

17. A method of detecting a background color of a document based on image data of a colormetric system in which a brightness component and a color component are separated, comprising the steps of:
   dividing a color plane defining the color component into a plurality of color areas, and counting a first number of elements of the image data belonging to each color area of the plurality of color areas;
   counting a second number of elements of the image data belonging to each area of a multiple area constituted of mutually adjacent color areas of the plurality of color areas;
   extracting a color area in which the first number of elements of the image data exceeds a first threshold value, and giving a positive evaluation to the extracted color area;
   extracting a multiple area in which the second number of elements of the image data exceeds a second threshold value and giving a positive evaluation to each color area included in the extracted multiple area; and specifying a color area receiving a positive evaluation both individually and as part of a multiple area as a color area of background color.

18. The method of detecting the background color of the document according to claim 17, further comprising:

extracting image data belonging to the color area of background color as background color image data, out of the image data acquired by scanning a prescribed area of the document;

specifying a maximum value of values of the color component of the background color image data as the maximum value of the color component of background color; and specifying a minimum value of the values of the color component of the background color image data as the minimum value of the color component of background color.

19. A method of detecting a background color of a document based on image data of a colormetric system in which a brightness component and a color component are separated, including the steps of:

dividing a color plane defining the color component into a plurality of color areas and counting a first number of elements of the image data belonging to each color area of the plurality of color areas;

calculating a second number of elements of the image data belonging to each area of a multiple area constituted of mutually adjacent color areas of the plurality of color areas, based on the counted number of elements; and extracting a color area in which the first number of elements of the image data exceeds a first threshold value and giving a positive evaluation to the extracted color area;

extracting a multiple area in which the second number of elements of the image data exceeds a second threshold value, and giving a positive evaluation to each color area included in the extracted multiple area; and specifying a color area receiving a positive evaluation both individually and as part of a multiple area as a color area of background color.

20. The method of detecting the background color of the document according to claim 19, further comprising:

extracting image data belonging to the color area of background color as background color image data, out of the image data acquired by scanning a prescribed area of the document;

specifying a maximum value, of values of the color component of the background color image data as the maximum value of the color component of background color; and specifying a minimum value of the values of the color component of the background color image data as the minimum value of the color component of background color.

* * * * *